United States Patent
Theobald

(10) Patent No.: US 10,437,255 B1
(45) Date of Patent: *Oct. 8, 2019

(54) MOBILE ROBOT WITH CONVEYOR SYSTEM

(71) Applicant: Vecna Technologies, Inc., Cambridge, MA (US)

(72) Inventor: Daniel Theobald, Somerville, MA (US)

(73) Assignee: VECNA ROBOTICS, INC., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/103,312

(22) Filed: Aug. 14, 2018

Related U.S. Application Data

(63) Continuation of application No. 14/926,970, filed on Oct. 29, 2015, now Pat. No. 10,048,697.

(51) Int. Cl.
| | |
|---|---|
| G05D 1/02 | (2006.01) |
| B25J 9/00 | (2006.01) |
| B65G 47/61 | (2006.01) |
| G05D 1/00 | (2006.01) |
| B25J 5/00 | (2006.01) |

(52) U.S. Cl.
CPC .............. G05D 1/0268 (2013.01); B25J 5/00 (2013.01); B25J 9/0093 (2013.01); B65G 47/61 (2013.01); G05D 1/0088 (2013.01); *Y10S 901/01* (2013.01)

(58) Field of Classification Search
CPC .... G05D 1/0268; G05D 1/0088; B65G 47/61; B65G 7/07; B65G 1/00; B65G 47/46; B65G 43/00; B25J 5/00; B25J 9/0093; A61G 7/1013; A61G 7/1025; A61G 7/1001; Y10S 901/10

USPC ......... 198/463.3, 468.01; 414/351, 353, 395, 414/398, 400, 279, 280

See application file for complete search history.

(56) References Cited

U.S. PATENT DOCUMENTS

| | | |
|---|---|---|
| 4,082,194 A | 4/1978 | Sheehan |
| 4,792,995 A | 12/1988 | Harding |
| 4,918,607 A * | 4/1990 | Wible ..................... G01S 17/74 |
| | | 180/169 |
| 5,202,832 A | 4/1993 | Lisy |
| 5,664,929 A | 9/1997 | Esaki |
| 6,543,983 B1 | 4/2003 | Felder |

(Continued)

OTHER PUBLICATIONS

Tuen (Les de Prieele, The best way to unload a container, https://www.youtube.com/watch?v=Mc-IC1 yclgU Nov. 17, 2009).

(Continued)

*Primary Examiner* — James R Bidwell

(57) ABSTRACT

A mobile robot is provided for use in an operating environment. The mobile robot may include a mobile robot base, a conveyor system and a drive system. The conveyor system may be supported by the mobile robot base. The conveyor system may include a conveyor belt configured to receive an item with the mobile robot and/or provide the item from the mobile robot. The conveyor system may be configured to support the item during movement of the mobile robot within the operating environment. The drive system may be arranged with the mobile robot base. The drive system may be configured to move the mobile robot within the operating environment and position the conveyor system such that the conveyor belt is operable to receive the item with the mobile robot and/or provide the item from the mobile robot.

8 Claims, 14 Drawing Sheets

(56) References Cited

U.S. PATENT DOCUMENTS

| | | | |
|---|---|---|---|
| 6,764,266 | B2 | 7/2004 | Young |
| 7,719,222 | B2 | 5/2010 | Theobald |
| 8,340,851 | B2 | 12/2012 | Wang |
| 8,425,173 | B2 | 4/2013 | Lert |
| 9,864,371 | B2 * | 1/2018 | Douglas ............... G05D 1/0225 |
| 10,048,697 | B1 * | 8/2018 | Theobald ............ G05D 1/0268 |
| 2004/0093116 | A1 | 5/2004 | Mountz |
| 2007/0039117 | A1 | 2/2007 | Goldenberg |
| 2008/0046116 | A1 | 2/2008 | Khan et al. |
| 2009/0028678 | A1 | 1/2009 | Kutzer |
| 2009/0313942 | A1 | 12/2009 | Murarotto |
| 2011/0238207 | A1 | 9/2011 | Bastian, II et al. |
| 2012/0321423 | A1 | 12/2012 | MacKnight |
| 2012/0330458 | A1 | 12/2012 | Weiss |
| 2013/0317642 | A1 | 11/2013 | Asaria et al. |
| 2014/0100998 | A1 | 4/2014 | Mountz et al. |
| 2014/0214196 | A1 | 7/2014 | Worsley |
| 2014/0365258 | A1 | 12/2014 | Vestal |
| 2015/0182403 | A1 | 7/2015 | Lim |
| 2016/0132059 | A1 | 5/2016 | Mason |

OTHER PUBLICATIONS

FM 55-17 (Cargo Specialists' Handbook, 1999).

Frost (Navy SBIR 2010.1—Topic N101-091 Title: Automated Shipboard Build-up of Customized Pallet Loads, https://www.navysbir.com/n10_1/N101-091.htm Dec. 10, 2009).

Tsai (Modeling and analysis of three-dimensional robotic palletizing systems for mixed carton sizes, 1987 Retrospective Thesis and Dissertations, Iowa State University).

McCarthy, J.C., SeaBasing Logistics, NOIA 10$^{th}$ Annual Expeditionary Warfare Conference, Oct. 25, 2005.

McCarthy, J.D., Seabasing Logistics Enabling Concepts, Dec. 2006.

Work, R., Thinking About Seabasing: All Ahead, Slow, 2006.

Yarman, H., Manufacturer's mixed pallet design problem, European Journal of Operational Research 186 (2008) 826-840.

AIDCO International: AIDCO robot palletizing for building mixed product pallets, May 12, 2009, https://www.youtube.com/watch?v=1 khQAnGDCSo.

James, R.J.W., Three Dimensional Container Packing for Drums and Pallets, University of Canterbury, New Zealand, 1999.

Moura, A. "A Grasp Approach to the Container-Loading Problem," IEEE Intelligent Systems 20.4 (2005): 50-57.

Terno, J., An Efficient Approach for the Multi-Pallet Loading Problem, Institute of Numerical Mathematics, Technical University Dresden Mommsenstr. 13, D-01062 Dresden, Germany Oct. 15, 1997.

Schlenoff, C., Performance Evaluation of Intelligent Systems at the National Institute of Standards and Technology (NIST) ITEA Journal 2011: 32: 59-67.

Whelan, P.F., Automated Packing Systems—A Systems Engineering Approach IEEE Transactions on Systems, Man, and Cybernetics—Part A: Systems and Humans, vol. 16, No. 5, Sep. 1996.

Bogh, S., Autonomous Industrial Mobil Manipulation (AIMM): From Research to Industry, In Proceedings of the 42$^{nd}$ International Symposium on Robotics. VOE Verlag GMBH, 2011.

Hvilshoj, M., "Little Helper"—An Autonomous Industrial Mobile Manipulator Concept, International Journal of Advanced Robotics Systems, vol. 8, No. 2 (2011) p. 80-90.

Garibotto, G., Industrial Exploitation of Computer Vision in Logistic Automation: Autonomous Control of an Intelligent Forklift Truck, Proceedings of the 1998 IEEE International Conference on Robotics & Automation Leuven, Belgium, May 1998.

Correa, A., Multimodal Interaction with an autonomous Forklift, IEEE, 2010.

Coleman, N., Smart Crane Ammunition Transfer System: Real-Time Control, American Institute of Aeronautics and Astronautics, Inc., 1998.

Robotics Research: Dexterous Manipulators and Advanced Control Systems, Robotics Research Corporation, 2005.

Wiki Archive Page dated Nov. 15, 2011: Battlefield Extraction—Assist Robot.

Overview BEAR Robot dated 201 O https://www.youtube.com/watch?v=8rdRxV-qn3w.

Episode 2 BEAR Robot dated 2009 https://www.youtube.com/watch?v=0RuVidE73Y8.

Episode 1 BEAR Robot dated 2009 https://www.youtube.com/watch?v=irvDKCszJxk.

Rosen, J., Surgical Robotics: Systems Applications and Visions, Springer Science & Business Media, 2011.

Gilbert, G. R., United States Department of Defense Research in Robotic Unmanned Systems for Combat Casualty Care, 2010.

Fetzek, C.A., Behavior-Based Power Management in Autonomous Mobile Robots, Thesis Air Force Institute of Technology, 2008 Wright-Patterson Air Force Base, Ohio.

* cited by examiner

MOBILE ROBOT WITH CONVEYOR SYSTEM

PRIORITY INFORMATION

The present application is a continuation of U.S. patent application Ser. No. 14/926,970, filed Oct. 29, 2015, U.S. Pat. No. 10,048,697, issued Aug. 14, 2018, the contents of which is incorporated herein by reference in its entirety.

BACKGROUND OF THE INVENTION

1. Field of the Invention

This disclosure relates generally to robotics and, more particularly, to a mobile robot for moving items within an operating environment.

2. Introduction

An order fulfillment center typically includes a warehouse with a storage area and a packaging area. To fulfill customer orders, items within the storage area are gathered and moved to the packaging area to be packaged and subsequently shipped to customers.

Items may be gathered and moved within an order fulfillment center in various manners. A large fulfillment center, for example, may include a sorting system for picking items from the storage area and transporting those items to the packaging area. A sorting system may include a large network of conveyors and slides. This network of conveyors and slides may also be paired with at least one picking machine. With such an arrangement, the picking machine picks items in the storage area and dispose those items with the conveyors and slides. The conveyors and slides subsequently transport the items to various destinations; e.g., outputs within the packaging area. Such a sorting system, however, typically requires a large and permanent infrastructure which is expensive to implement and maintain. Furthermore, such a sorting system typically is difficult to reconfigure for retrofitting.

There is a need in the art for improved methods, apparatuses and systems for transporting and/or sorting items between locations.

SUMMARY

Methods, apparatuses and systems are provided involving at least one mobile robot. In one embodiment, a mobile robot is provided for use in an operating environment. The mobile robot may include a mobile robot base, a conveyor system and a drive system. The conveyor system may be supported by the mobile robot base. The conveyor system may include a conveyor belt configured to receive an item with the mobile robot and/or provide the item from the mobile robot. The conveyor system may be configured to support the item during movement of the mobile robot within the operating environment. The drive system may be arranged with the mobile robot base. The drive system may be configured to move the mobile robot within the operating environment and position the conveyor system such that the conveyor belt is operable to receive the item with the mobile robot and/or provide the item from the mobile robot.

BRIEF DESCRIPTION OF THE DRAWINGS

The following detailed description will be better understood when read in conjunction with the appended drawings, in which there is shown one or more embodiments of the present disclosure. It should be understood, however, that the various embodiments of the present disclosure are not limited to the precise arrangements and instrumentalities shown in the drawings.

DETAILED DESCRIPTION

Figure 1:
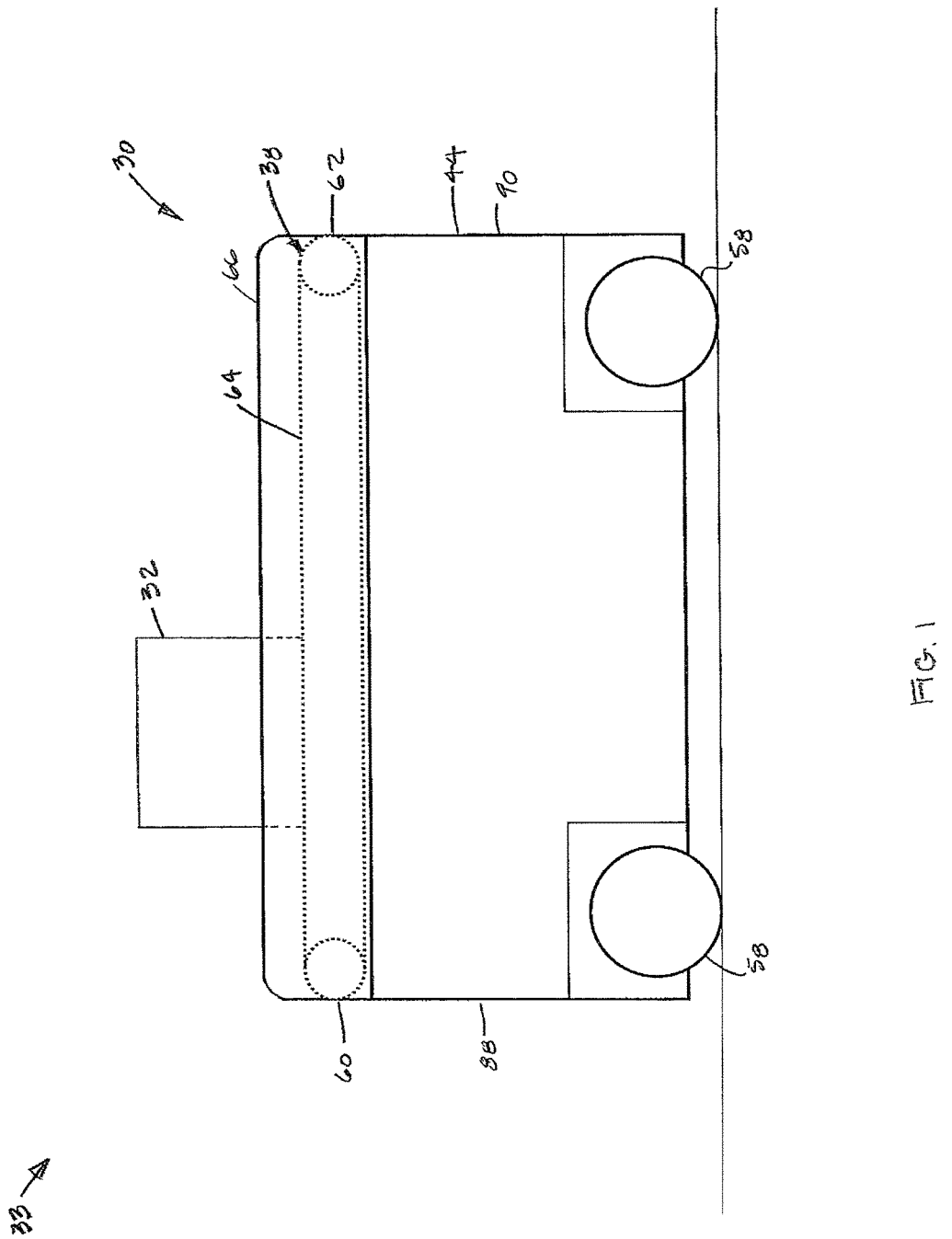
FIG. 1 is a side view diagrammatic illustration of a mobile robot.
Figure 2:
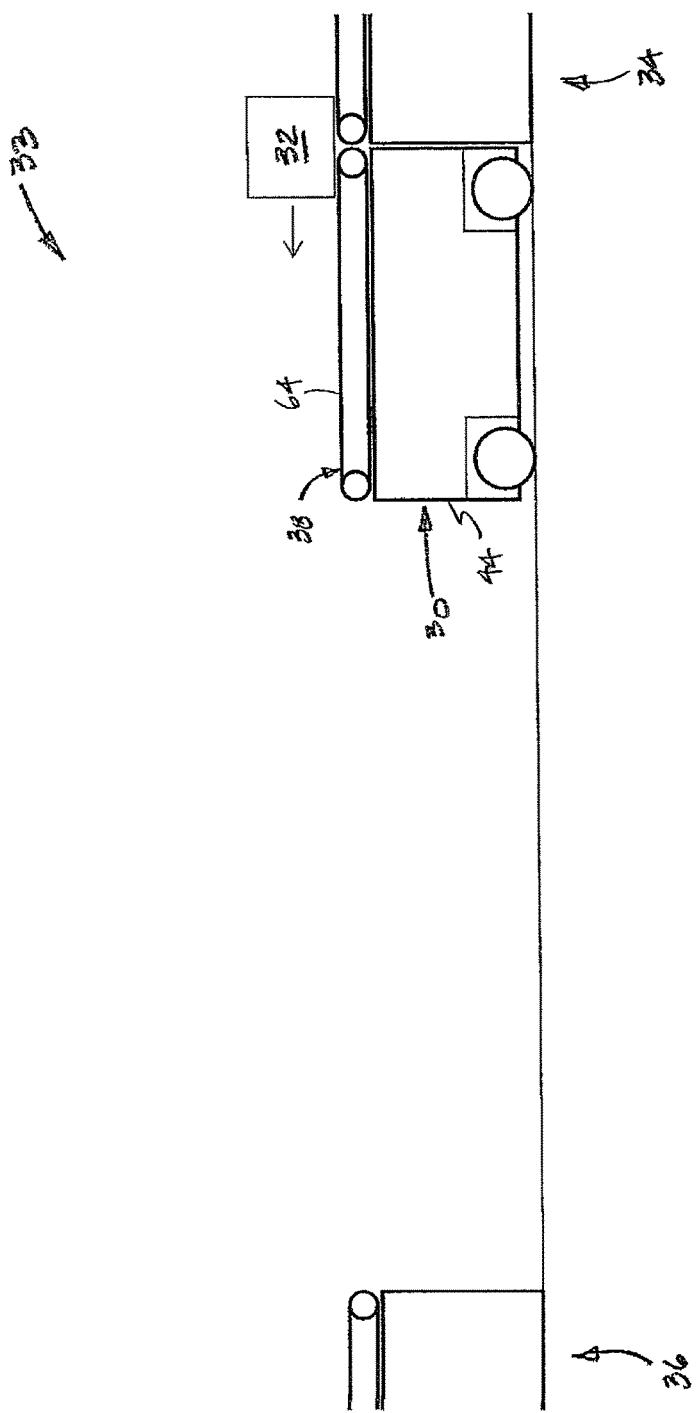
FIG. 2 is a side view diagrammatic illustration of the mobile robot receiving an item at a pickup location within an operating environment.
Figure 3:
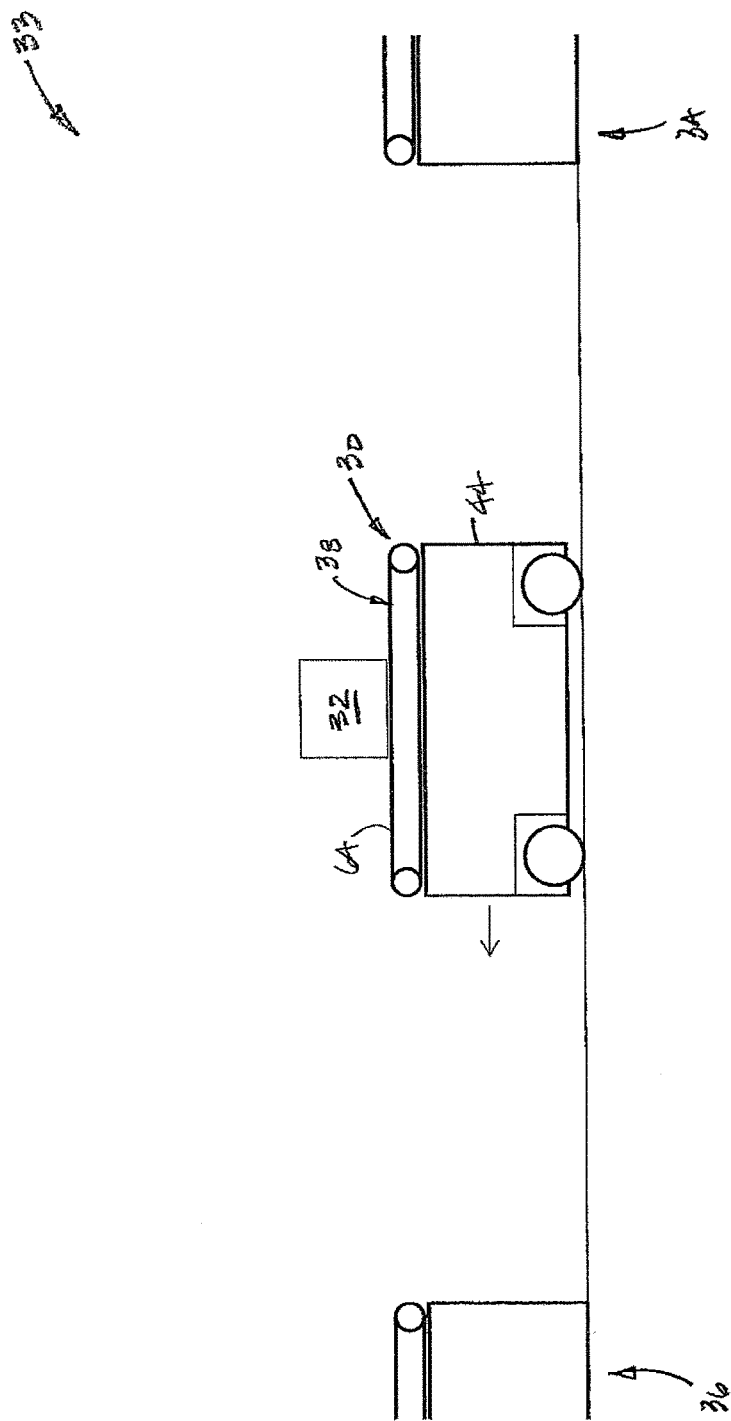
FIG. 3 is a side view diagrammatic illustration of the mobile robot transporting the item between the pickup location and a drop off location within the operating environment.
Figure 4:
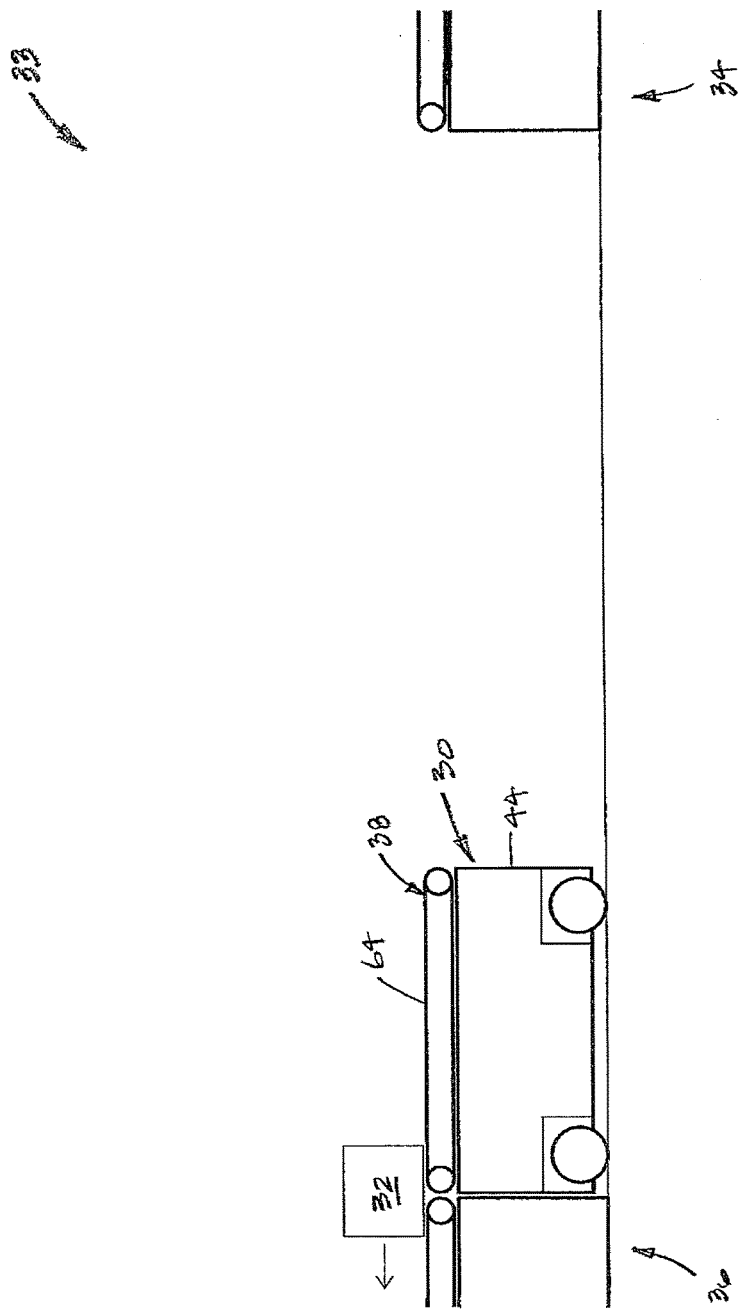
FIG. 4 is a side view diagrammatic illustration of the mobile robot providing the item at the drop off location within the operating environment.

FIG. 1 illustrates a mobile robot 30 configured to transport one or more items 32 within an operating environment 33. This mobile robot 30, as shown in FIG. 2 for example, may autonomously gather or otherwise receive an item 32 (or items) at a pickup location 34. Referring to FIG. 3, the mobile robot 30 may autonomously move the received item 32 from the pickup location 34 to a drop off location 36. Briefly, this item 32 movement may involve moving the mobile robot 30, with which the item 32 is disposed, within the operating environment 33. The item 32 movement may also (or alternatively) involve moving the item 32 relative to the mobile robot 30 utilizing a conveyor system 38, where the mobile robot 30 may be stationary and/or moving within the operating environment 33. Referring to FIG. 4, the mobile robot 30 may subsequently autonomously deliver or otherwise provide the item 32 at the drop off location 36. Such item 32 transportation may be utilized to provide a virtual item sorting system as described below. However, the mobile robot 30 may also or alternatively be configured to perform one or more tasks other than the foregoing exemplary transportation task.

Referring again to FIG. 1, the mobile robot 30 may be configured as an autonomous mobile robot such as, for example, an autonomous vehicle or autonomous mobile conveyor system. More particularly, this mobile robot 30 may be configured to perform one or more of its tasks without continuous outside control and/or intervention. The mobile robot 30, for example, may receive instructions to perform a certain task at a certain location; e.g., receive an item 32 at a pickup location 34, etc. The mobile robot 30 may subsequently determine and perform the operation(s) necessary to complete the task based on one or more factors. Such factors may include, but are not limited to, a current location of the mobile robot 30, the location of where the task is to be performed, obstacle(s) surround the mobile robot 30, obstacle(s) between the mobile robot 30 and the location of where the task is to be performed, the type of operating environment in which the task is to be performed, and the type of task to be performed. The mobile robot 30 may also be configured to adapt to unknown, new and/or changing operating environments without additional (e.g., human) outside control and/or intervention.

The mobile robot 30 may be fully autonomous during performance of one or more of its tasks. The mobile robot 30 may also or alternatively be semi-autonomous during performance of one or more of its tasks. The mobile robot 30 may still also or alternatively be (e.g., remote) controlled by an operator (e.g., a human controller) during performance of one or more of its tasks.

The term "fully autonomous" may be used to describe an apparatus that performs one or more tasks without, for example, any outside control and/or intervention. A fully autonomous mobile robot, for example, may perform a task without receiving instructions (e.g., vectors, commands, etc.) from a human operator during performance of the task.

The term "semi-autonomous" may be used to describe an apparatus that performs one or more tasks without, for example, continuous outside control. A semi-autonomous mobile robot, for example, may perform a task utilizing one or more periodic instructions from an operator (e.g., a human controller) that bound and/or qualify the performance of the task. The instructions may provide, for example, an updated location of where the task is to be performed, identify an unknown obstacle, control the scope of the task, control when the task should be performed, define how the task should be performed, define how the task should not be performed, etc.

Figure 5:
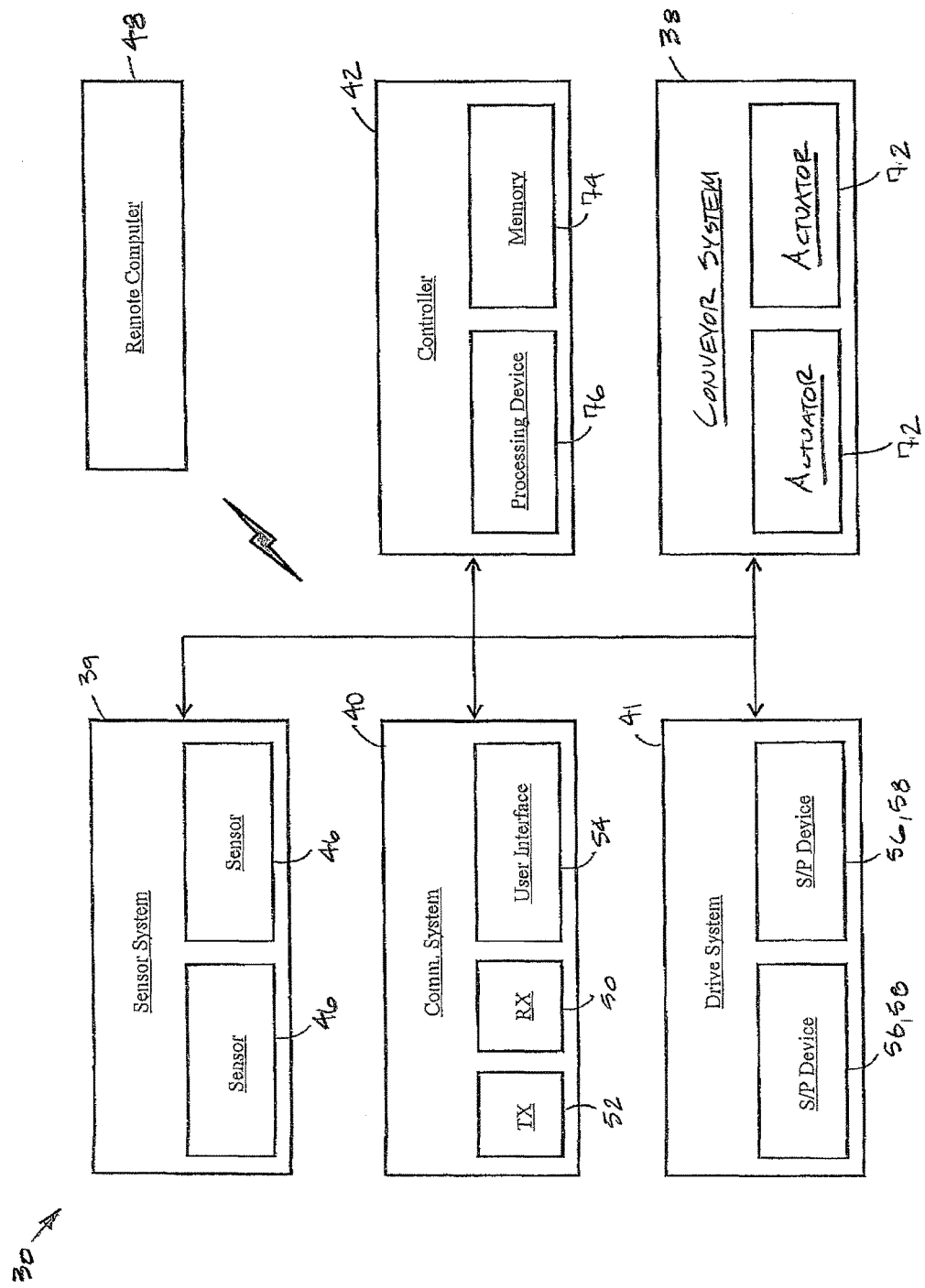
FIG. 5 is a block diagram of mobile robot subsystems and a remote computer system in signal communication with the mobile robot.

FIG. 5 is a block diagram of the mobile robot 30. The mobile robot 30 includes a sensor system 39, a communication system 40, a drive system 41 and the conveyor system 38. The mobile robot 30 also includes a controller 42 in signal communication (e.g., hardwired and/or wirelessly connected) with one or more of the other components (e.g., 38-41) of the mobile robot 30. Each of the foregoing mobile robot components 38-42 is configured with (e.g., housed within and/or attached to) a base 44 (e.g., body) of the mobile robot 30.

The sensor system 39 is adapted to survey one or more aspects of the mobile robot's operating environment 33. The sensor system 39, for example, may be used to determine the presence of, to locate, to determine an identity of, to track and/or determine physical characteristics of one or more aspects of the operating environment 33. These aspects may include, but are not limited to:

Topology of the operating environment 33 or an area thereof;
Structural features of and/or in the operating environment 33 such as walls, doors, ceilings, stairs, lifts, etc.; and
Objects in the operating environment 33 such as other entities (e.g., individuals and/or mobile robots), storage units, items, obstructions, etc.

The sensor system 39 may also or alternatively be adapted to receive location data indicative of a location of the mobile robot 30 and/or location(s) of other objects within the operating environment 33.

The sensor system 39 includes one or more sensors 46 such as, for example, location sensors. These sensors 46 may be operated to spatially locate (e.g., triangulate) the mobile robot 30 relative to, for example, its surrounding environment, its geographic location and/or one or more locators. Examples of a locator include, but are not limited to, an RFID tag and a physical landmark. The sensors 46 may also or alternatively be operated to locate and/or identify other objects within the operating environment 33. Examples of a sensor 46 which may be included with the sensor system 39 include, but are not limited to, a proximity sensor, a global position system (GPS), a radar system, an infrared system, a laser system, a radio transceiver, and a visual location system with at least one optical camera.

The communication system 40 may be adapted to receive data from a remote computer 48 such as, but not limited to, a central hub. Other examples of a remote computer 48 include, but are not limited to, a tablet computer, a personal computer, a laptop computer, a personal digital assistant (PDA), a cell phone, a smart phone and a Bluetooth enabled device. The communication system 40 may also or alternatively be adapted to send data to a remote computer (e.g., 48); e.g., the central hub. The communication system 40 of FIG. 5, for example, includes a receiver 50 and a transmitter 52, which may be configured together as a transceiver in other embodiments. The receiver 50 may be a cellular, satellite and/or radio receiver. The transmitter 52 may be a cellular, satellite and/or radio transmitter. The communication system 40 of the present disclosure, of course, is not limited to the foregoing exemplary receiver or transmitter types of configurations.

The communication system 40 may also be adapted to communicate information to one or more individuals who interact with the mobile robot 30 before, during and/or after performance of its task(s). The communication system 40 of FIG. 5, for example, includes a user interface 54.

The user interface 54 may be adapted to present information in the form of a visual message, which may include alpha-numeric characters, words (e.g., text-based instructions) and/or graphics. The user interface 54, for example, may be configured as or include a display (e.g., display screen or touch screen), a projector and/or a printer. The user interface 54 may also or alternatively be adapted to present information in the faun of an audible message, which may include words (e.g., verbal instructions) or code (e.g., a sequence of sounds, a certain tone or pitch, etc.). The user interface 54, for example, may be configured as or include an electro-acoustic transducer such as a loudspeaker. The user interface 54 may still also or alternatively be adapted to visually present information using a marking device such as a laser pointer or other light projection device, a media (e.g., paint, ink, chalk, etc.) applicator, etc. The communication system 40 of the present disclosure, of course, is not limited to the foregoing exemplary user interface 54 type or configuration.

Figure 6:
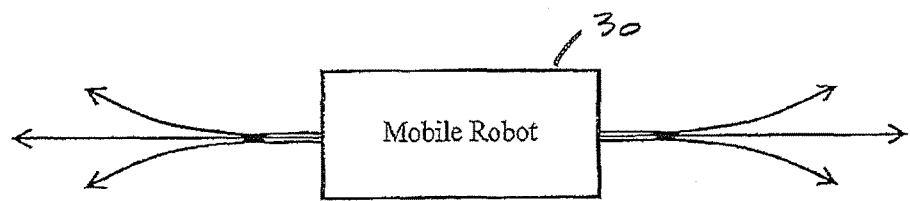
FIG. 6 is a block diagram illustration of steerable, forward and reverse movement of the mobile robot.
Figure 7:
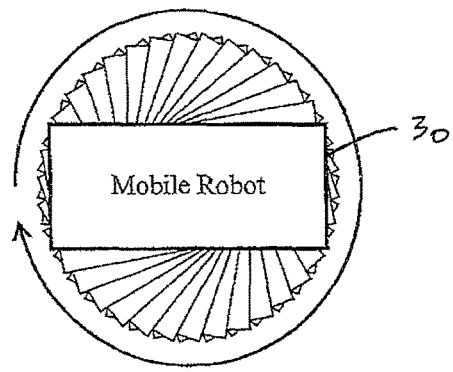
FIG. 7 is a block diagram illustration of zero turn movement of the mobile robot.
Figure 8:
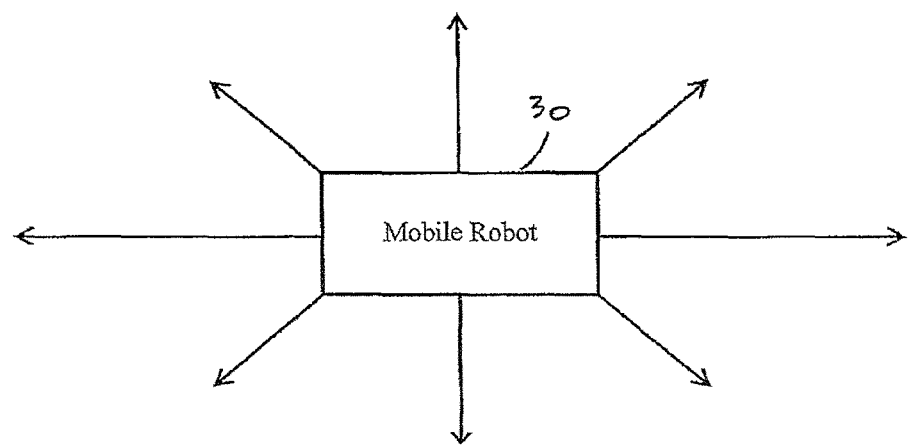
FIG. 8 is a block diagram illustration of omnidirectional movement of the mobile robot.

The drive system 41 is adapted to move the mobile robot 30 within its operating environment 33; e.g., inside and/or outside of a building. The drive system 41 may enable general steerable, forward and reverse movement of the mobile robot 30 as shown in FIG. 6. The drive system 41, however, may also enable zero turn movement of the mobile robot 30 as shown in FIG. 7. "Zero turn movement" may describe movement where the mobile robot 30 can turn with a zero or very close to zero turning radius; e.g., pivot substantially about a single point. In this manner, the mobile robot 30 may be a zero turn mobile robot. The drive system 41 may also or alternatively enable omnidirectional movement of the mobile robot 30 as shown in FIG. 8. "Omnidirectional movement" may describe movement where the mobile robot 30 may travel laterally (e.g., substantially sideways or diagonally) without reorienting its body. In this manner, the mobile robot 30 may be an omnidirectional mobile robot.

The drive system 41 includes one or more steering and/or propulsion ("S/P") devices 56. The drive system 41 of FIGS. 1 to 4, for example, includes a plurality of wheels 58. One or more of these wheels 58 may each be driven by a discrete motor. At least some of the wheels 58 may also or alternatively be driven by a common motor through a drivetrain. One or more of the wheels 58 may be pivoted so as to steer mobile robot 30 movement. The rotational velocity of some or all of the wheels 58 may also or alternatively be individually controlled so as to provide propulsion and steering. The drive system 41 of the present disclosure, of course, is not limited to the foregoing exemplary wheeled configuration. For example, in other embodiments, the drive system 41 may include a plurality of motorized (e.g., robotic and multi-linkage) track systems.

It is worth noting, the above described S/P devices 56 may be configured and/or operated so as to provide a desired maneuverability; e.g., steerable forward/reverse movement, zero turn movement, omnidirectional movement, etc. For example, zero turn movement may be enabled utilizing independent all wheel 58 steering as well as various other techniques. Omnidirectional movement may be enabled utilizing independent all wheel 58 steering as well as various other techniques. However, a body of the mobile robot 30 may also or alternatively be rotatably (e.g., twistably) or otherwise mounted to the drive system 41 (e.g., via a rotatable turret) so as to provide functionality of a zero turn mobile robot or an omnidirectional mobile robot without requiring a complex drive system. For example, rather than providing all wheel steering, the body may be rotated as the drive system 41 moves so as to provide functional omnidirectional movement. The mobile robot 30 of the present disclosure, of course, is not limited to any particular devices or techniques for enabling its maneuverability.

Figure 9:
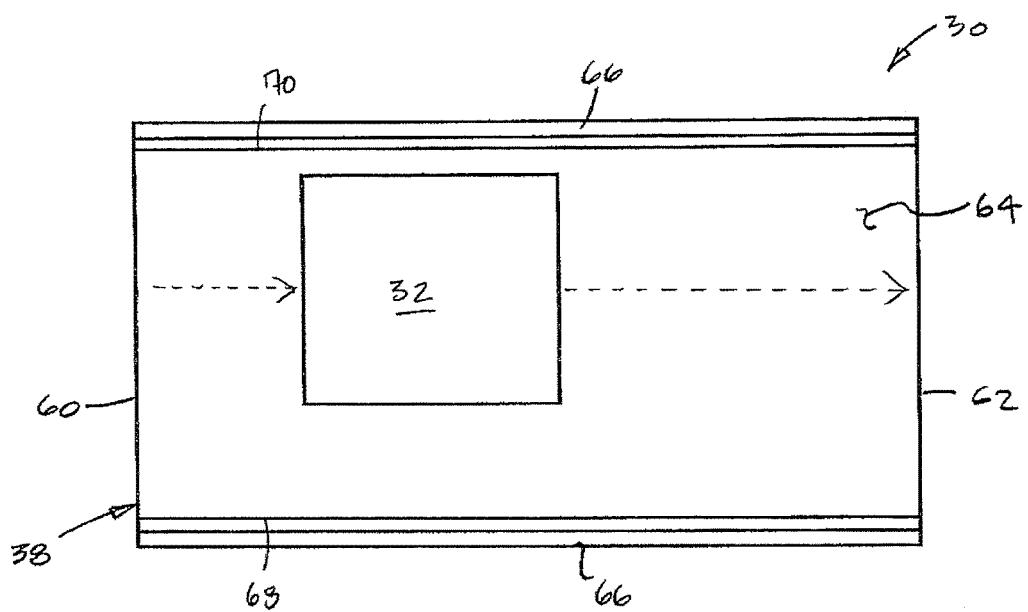
FIG. 9 is a top view diagrammatic illustration of the mobile robot.

Referring to FIGS. 1 and 9, the conveyor system 38 is supported on a top portion of the mobile robot base 44. The conveyor system 38 is configured to support an item 32 (or items or a quantity of media) thereon. The conveyor system 38 is also configured to carry and thereby move the item 32 (or items or the quantity of media) at least partially along a longitudinal length thereof, which length extends longitudinally between its opposing ends 60 and 62. The conveyor system 38 of FIGS. 1 and 9, for example, includes a conveyor belt 64.

The conveyor belt 64 may be configured from a single continuous hoop of flexible material; e.g., a rubber belt. The conveyor belt 64 may alternatively be configured from a plurality of belt links, which links are connected together into a hoop. Such belt links may be made from flexible material (e.g., a polymer) or relatively stiff material (e.g., metal or plastic or composite). The conveyor belt 64 may have a generally flat and smooth support/carrying surface. Alternatively, the conveyor belt 64 may include one or more generally laterally extending ribs and/or one or more longitudinally extending rails and/or dividers. The conveyor system 38 of the present disclosure, however, is not limited to the foregoing conveyor belt 64 types or configurations.

At least a longitudinal portion of the conveyor belt 64 and, more generally, the conveyor system 38 may be positioned laterally between two guiderails 66. The guiderails 66 of FIGS. 1 and 9, for example, are positioned next to and on opposing lateral sides 68 and 70 of the conveyor belt 64. Each of these guiderails 66 extends for substantially an entire longitudinal length of the conveyor belt 64. In this manner, the guiderails 66 may provide a barrier so as to prevent the item 32 (or items or the quantity of media) on the conveyor belt 64 from falling off a side (e.g., 68 or 70) of the conveyor system 38 during item 32 movement; e.g., rotation of the conveyor belt 64.

Figure 10:
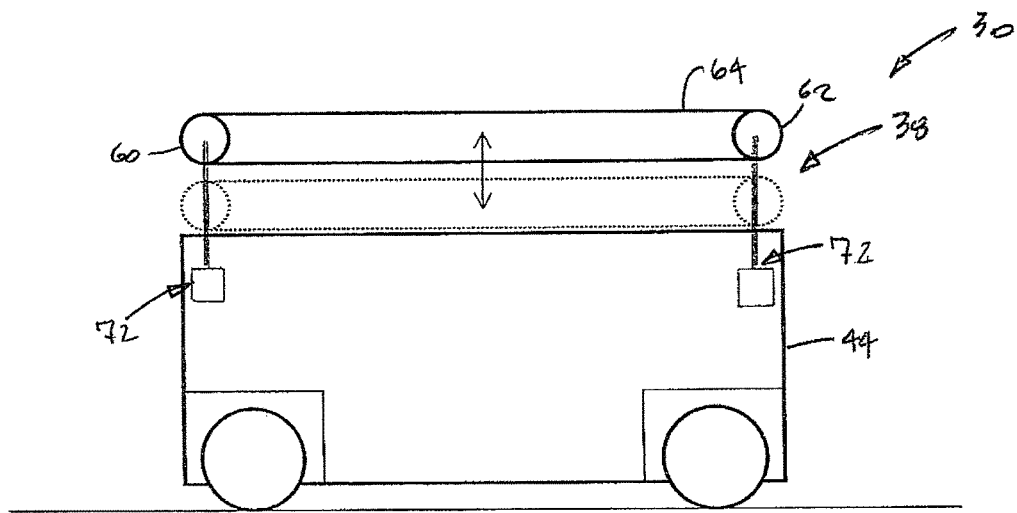
FIG. 10 is another side view diagrammatic illustration of the mobile robot.
Figure 11:
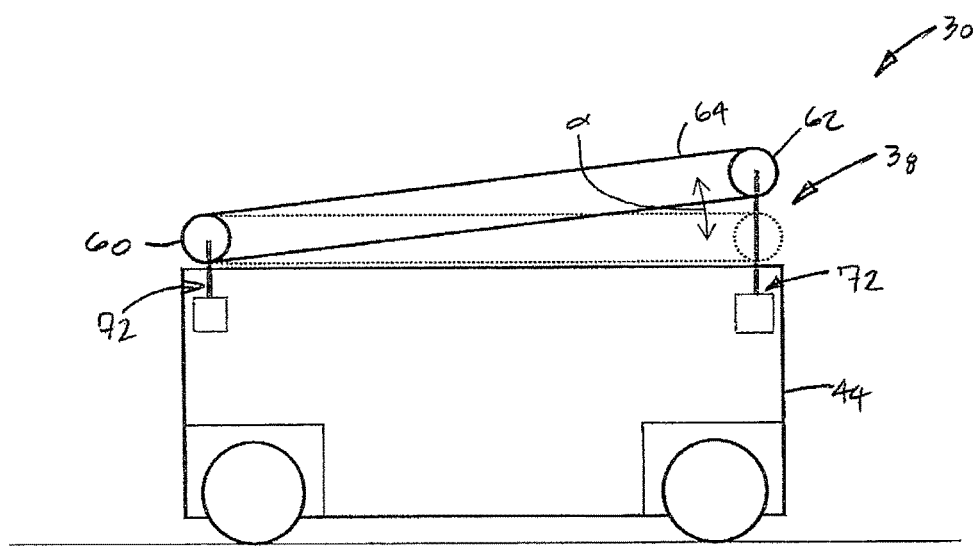
FIG. 11 is another side view diagrammatic illustration of the mobile robot.

The conveyor system 38 may also include one or more actuators 72. These actuators 72 may be configured to adjust and change the position and/or orientation of at least one component (e.g., 64) of the conveyor system 38. Referring to FIG. 10, for example, the actuators 72 may be configured to adjust the vertical height of generally the entire conveyor belt 64 (or conveying surface). Referring to FIG. 11, the actuators 72 may also or alternatively be configured to independently adjust the vertical height of one or more of the ends 60, 62. The actuators 72 may thereby position one end (e.g., 62) higher than the other end (e.g., 60) to adjust and change an inclination a of the conveyor belt 64. In this manner, the conveyor system 38 of FIGS. 10 and 11 can accommodate receiving items 32 from and providing items 32 to devices having different vertical heights. This may be particularly useful where the mobile robot 30 is being implemented as a retrofit in an existing distribution sorting environment or in a temporary sorting environment.

The controller 42 may be implemented with hardware, or a combination of hardware and software. The hardware may include memory 74 and at least one processing device 76, which may include one or more single-core and/or multi-core processors. The hardware, of course, may also or alternatively include analog and/or digital circuitry other than that described above.

The memory 74 is configured to store software (e.g., program instructions) for execution by the processing device 76, which software execution may control and/or facilitate performance of one or more operations such as those described in the method(s) below. The memory 74 may be a non-transitory computer readable medium. For example, the memory 74 may be configured as or include a volatile memory and/or a nonvolatile memory. Non-limiting examples of a volatile memory may include a random access memory (RAM) such as a dynamic random access memory (DRAM), a static random access memory (SRAM), a synchronous dynamic random access memory (SDRAM), a video random access memory (VRAM), etc. Non-limiting examples of a nonvolatile memory may include a read only memory (ROM), an electrically erasable programmable read-only memory (EEPROM), a computer hard drive, etc.

Figure 12:
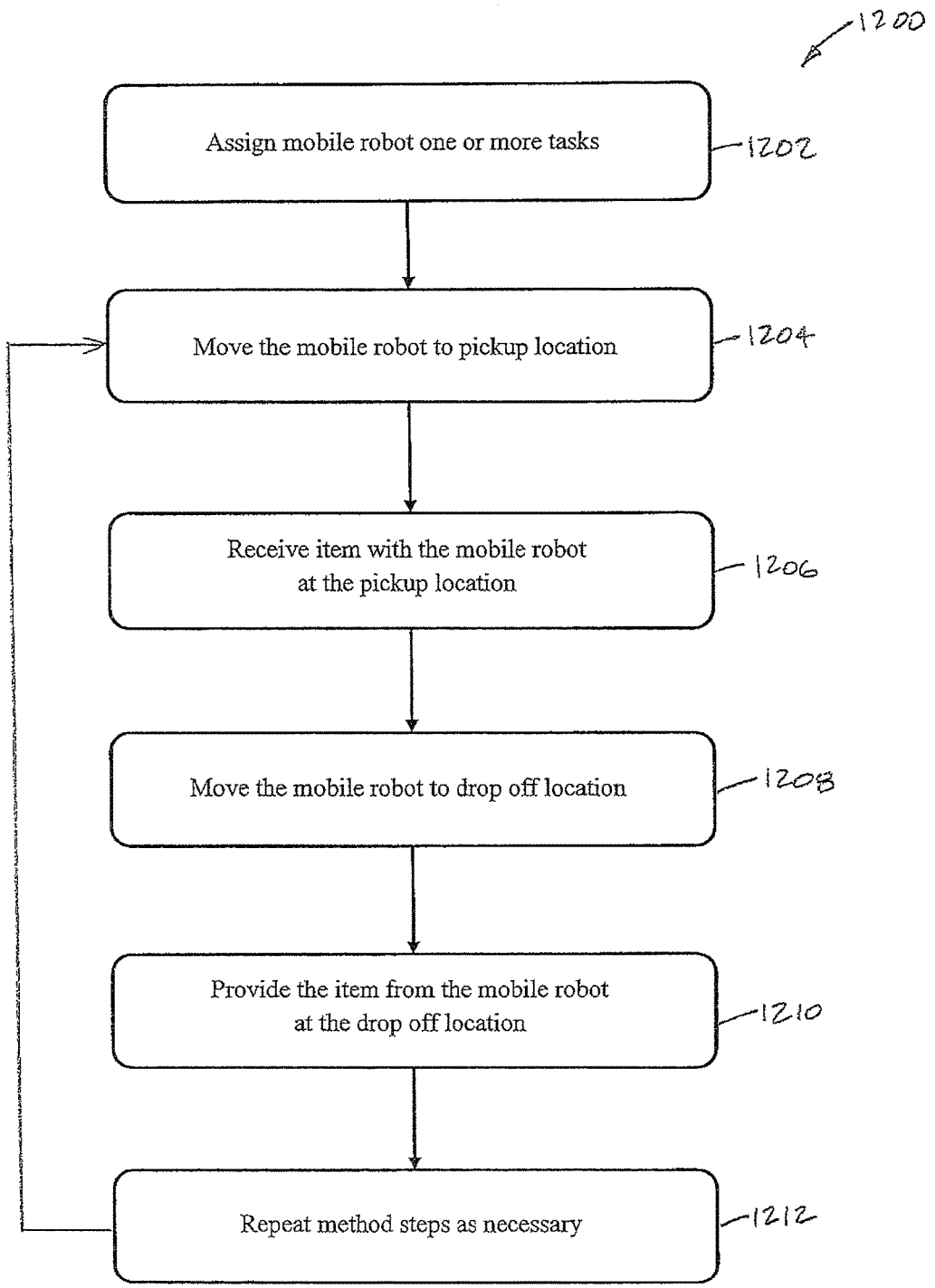
FIG. 12 is a flow diagram of a method involving a mobile robot.

FIG. 12 is a flow diagram of a method 1200 involving a mobile robot, which may be configured similar to the mobile robot 30 described herein and illustrated in the drawings. This method 1200 is performed to transport one or more items 32 (or a quantity or quantities of media) within an operating environment 33. However, for ease of description, the method 1200 is described below with reference to transporting a single item 32 with the mobile robot 30 of FIGS. 1-11.

The item 32 may be configured as a packaging device. The term "packaging device" may describe a device that can hold, support and/or otherwise contain one or more gaseous, liquid and/or solid materials. An example of a packaging device is a container such as a box, a lockbox, a crate, a canister, a bin, a pressure vessel, a tank, a suitcase, a vial or a pill box. Other examples of a packaging device include, but are not limited to, a pallet, a rack, a sack, a bag, a tube, or wrapping or packaging material. Of course, a packaging device may have a configuration and type other than those described above. Furthermore, while a packaging device may take various different forms as indicated above, the packaging device is described and referred to below as a container for ease of description.

Each container may be empty. Alternatively, the container may be partially or completely filled or loaded with one or more other items; i.e., the contents of an item 32. These contents may include various types of government, business and/or consumer articles; e.g., commodities. Alternatively, the item 32 itself may be configured as or otherwise include one or more of the government, business and/or consumer articles. The mobile robot 30 of the present disclosure, of course, is not limited to transporting the foregoing exemplary item types or configurations.

The operating environment 33 may be located inside and/or outside of one or more permanent and/or temporary structures: e.g., buildings. The mobile robot 30, for example, may perform its task(s) in an item sorting facility. Such an item sorting facility may be located at, but is not limited to, an order fulfillment center; a warehouse; a storage facility; a baggage sorting facility at a transportation depot such as an airport, a railroad station or a shipping station; or a parcel sorting facility such as a postal or package service center. The mobile robot 30 may perform its task(s) at a medical facility such as a hospital. The mobile robot 30 may perform its task(s) at a government and/or non-government complex, campus, compound, base and/or facility. The mobile robot 30, of course, may also or alternatively perform its task(s) at one or more indoor and/or outdoor areas other than those described above. For example, the mobile robot 30 may perform its task(s) onboard a vehicle such as a train, a ship, an aircraft, a spacecraft or a submersible. In another example, the mobile robot 30 may perform its task(s) at a location which is remote from other buildings.

In step 1202, the mobile robot 30 is assigned one or more tasks. The mobile robot 30, for example, may be tasked to gather or otherwise receive the item 32 at a pickup location 34A (see FIG. 13). The mobile robot 30 may be tasked to move the item 32 from the pickup location 34A to a drop off location 36C. The mobile robot 30 may also be tasked to deliver or otherwise provide the item 32 at the drop off location 36C.

One or more of the tasks may be assigned by another device such as the remote computer 48 (see FIG. 5). The mobile robot 30, for example, may receive assignment data from the remote computer 48 through its communication system 40. One or more of the tasks may also or alternatively be assigned by an individual (or individuals) through the communication system 40. The individual(s), for example, may select or program desired task assignments using the user interface 54. One or more of the tasks may still also or alternatively be self-assigned by the mobile robot 30. For example, where the task(s) are routine, the controller 42 may periodically self-assign its task(s). In another example, where another mobile robot (not shown) in the operating environment 33 notifies the mobile robot 30 it cannot perform an assigned task, the controller 42 may reassign the task to itself if the mobile robot 30 is available and/or the task is of high priority, for example. The method 1200 and the mobile robot 30 of the present disclosure, of course, are not limited to the foregoing exemplary task assignment methodologies.

Figure 13:
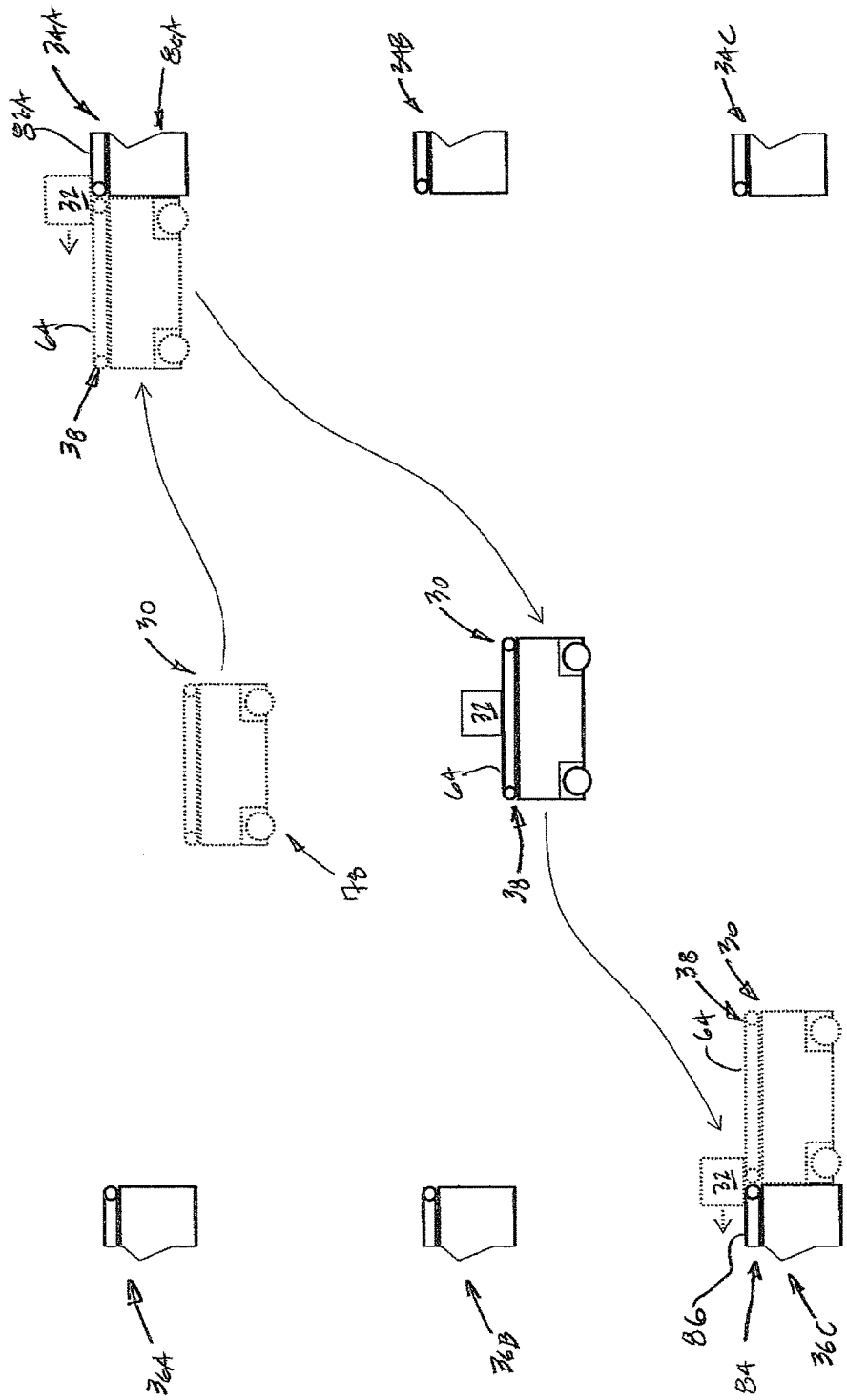
FIG. 13 is a block diagram of the mobile robot operating according to an embodiment of the method of FIG. 12.

In step 1204, the mobile robot 30 moves to the pickup location 34A as shown in FIG. 13. The controller 42, for example, may signal the drive system 41 to autonomously move the mobile robot 30 along a predetermined path or an undetermined path from a starting location 78 to the pickup location 34A. The term "undetermined" may describe a path that is selected or created as the mobile robot 30 is moving to, for example, its destination; in the step 1204, the pickup location 34A. The path selection or creation may be based on one or more factors: route of shortest distance; route of shortest time; obstacles encountered along the way; other tasks to perform; etc.

To avoid a known or unknown obstacle (e.g., human, object or any other type of other entity) along the path, the controller 42 may signal the drive system 41 to slightly or dramatically divert its course around the obstacle based on data received from the sensor system 39. The controller 42 may also or alternatively signal the obstacle (e.g., a remotely actuated doorway) to partially or completely move or open. Upon arriving at the pickup location 34A, the controller 42 may signal the drive system 41 to stop and "park" the mobile robot 30 such that the conveyor system 38 may gather or otherwise receive the item 32 as described below.

In step 1206, the mobile robot 30 gathers or otherwise receives the item 32 as shown in FIGS. 2 and 13. For example, as described above, the controller 42 may signal the drive system 41 during the step 1204 to stop and "park" the mobile robot 30 such that the conveyor system 38 may gather or otherwise receive the item 32. In particular, the mobile robot 30 may be parked next to a discrete, stationary conveyor system 80 at the pickup location 34 such that the conveyor belt 64 is longitudinally aligned with and next to a conveyor belt 82 of the stationary conveyor system 80. In addition, the controller 42 may signal one or more of the actuators 72 to move the conveyor system 38 such that the conveyor belts 64 and 82 may be appropriately vertically orientated relative to one another as needed; e.g., vertically aligned.

Once the mobile robot 30 and, more particularly, the conveyor system 38 is in desired item receiving position, the controller 42 may signal the stationary conveyor system 80 to move the item 32 on its conveyor belt 82 towards the conveyor system 38. The controller 42 may also signal the conveyor system 38 to move its conveyor belt 64 in a manner so as to receive the item 32 from the stationary conveyor system 80. In this manner, the mobile robot 30 may autonomously gather the item 32 at the pickup location 34.

Of course, in alternative embodiments, the item 32 may be received using techniques other than that described above. For example, the item 32 may be placed on the conveyor system 38 by another device (e.g., a manipulator arm, etc.) at the pickup location 34. This other device may be configured discrete from the mobile robot 30, or configured with the mobile robot base 44. In another example, the item 32 may be placed on or provided to the conveyor system 38 by a gravity actuated system; e.g., a slide chute for the stationary conveyor system 80. In still another example, the item 32 may be placed on the conveyor system 38 by an individual (e.g., a person) at the pickup location 34.

In step 1208, the mobile robot 30 moves to the drop off location 36C as shown in FIGS. 3 and 13. The controller 42, for example, may signal the drive system 41 to autonomously move the mobile robot 30 along a predetermined path or an undetermined path from the pickup location 34A to the drop off location 36C.

To avoid a known or unknown obstacle (e.g., human, object or any other type of other entity) along the path, the controller 42 may signal the drive system 41 to slightly or dramatically divert its course around the obstacle based on data received from the sensor system 39. The controller 42 may also or alternatively signal the obstacle (e.g., a remotely actuated doorway) to partially or completely move or open. Upon arriving at the drop off location 36C, the controller 42 may signal the drive system 41 to stop and "park" the mobile robot 30 such that the conveyor system 38 may deliver or otherwise provide the item 32 as described below.

In step 1210, the mobile robot 30 delivers or otherwise provides the item 32 as shown in FIGS. 4 and 13. For example, as described above, the controller 42 may signal the drive system 41 during the step 1208 to stop and "park" the mobile robot 30 such that the conveyor system 38 may deliver or otherwise provide the item 32. In particular, the mobile robot 30 may be parked next to another discrete, stationary conveyor system 84 at the drop off location 36 such that the conveyor belt 64 is longitudinally aligned with and next to a conveyor belt 86 of the stationary conveyor system 84. In addition, the controller 42 may signal one or more of the actuators 72 to move the conveyor system 38 such that the conveyor belts 64 and 86 may be appropriately vertically orientated relative to one another as needed; e.g., vertically aligned.

Once the mobile robot 30 and, more particularly, the conveyor system 38 is in desired item provision position, the controller 42 may signal the conveyor system 38 to move the item 32 on its conveyor belt 64 towards the stationary conveyor system 84. The controller 42 may also signal the stationary conveyor system 84 to move its conveyor belt 86 in a manner so as to receive the item 32 from the conveyor system 38. In this manner, the mobile robot 30 may autonomously deliver the item 32 at the drop off location 36.

Of course, in alternative embodiments, the item 32 may be provided using techniques other than that described above. For example, the item 32 may be picked up off of the conveyor system 38 by another device (e.g., a manipulator aril, etc.) at the drop off location 36. This other device may be configured discrete from the mobile robot 30, or configured with the mobile robot base 44. In another example, conveyor system 38 may move the item 32 onto a gravity actuated system; e.g., a slide chute for the stationary conveyor system 84. In still another example, the item 32 may be picked up off of the conveyor system 38 by an individual (e.g., a person) at the drop off location 36.

In step 1212, one or more of the foregoing method 1200 steps may be repeated in order to transport one or more additional items 32. One or more of these items 32 may be received from the same pickup location (e.g., 34A, 34B, 34C), or one or more other pickup locations (e.g., 34A and 34B, etc.). One or more of the items 32 may also be provided to the same drop off location (e.g., 36A, 36B, 36C), or one or more other drop off locations (e.g., 36A and 36B, etc.).

Using the method 1200, the mobile robot 30 may provide a virtual item sorting system within the operating environment 33. In particular, rather than including a complex infrastructure of conveyors, ramps, slides, manipulators, or other sorting devices to provide switchable paths between the locations, the mobile robot 30 may pick up an item 32 at one of a plurality of pickup locations and subsequently deliver that item 32 to one of a plurality of drop off locations based on one or more parameters. These parameters may include, but are not limited to:

A final destination for the item 32;
A method of shipping the item 32 from the operating environment 33 to the final destination for the item 32;
Type and/or configuration of the item 32 (e.g., size, weight, geometry, fragility, etc.);
Item delivery priority;
Cost of the item 32; and
Contents of the item 32.

For example, the mobile robot 30 may receive two items 32 from two different pickup locations 34. Where those items 32 are going to the same final destination, the mobile robot 30 may transport and deliver those items to the same drop off location 36, concurrently or sequentially. In another example, the mobile robot 30 may receive two of the same items 32 at the same pickup location 34. Where those items 32 are going to different final destinations, the mobile robot 30 may transport and deliver those items to two different drop off locations 36, concurrently or sequentially. Of course, various combinations of the foregoing examples are also contemplated.

In some embodiments, the method 1200 may be performed utilizing a plurality of the mobile robots 30. Each of these mobile robots 30, for example, may be tasked to receive items 32 from a certain pickup location 34, but then deliver those items 32 to any one or more of the drop off locations 36 based on the parameters associated the items 32. However, in other embodiments, each mobile robot 30 may be associated with a certain drop off location 36. In still other embodiments, there may be no association between the mobile robots 30 and the pickup or drop off locations 34 and 36.

In some embodiments, the mobile robot 30 may move laterally during the performance of its task. For example, the mobile robot 30 may move to one of its sides without changing the orientation of its base 44. This type of movement may be useful in order to get close to a storage unit or an item 32. This type of movement may also be useful to move around tight corners, through doorways, etc. Of course, the mobile robot 30 may also move laterally and longitudinally concurrently in order to move in a diagonal direction.

In some embodiments, the mobile robot 30 may have a relatively small form factor. The conveyor belt 64 and, thus, generally the conveyor system 38 of FIG. 1, for example, may have a lateral width of between about one foot (-1 ft) and about three feet (-3 ft); e.g., about two feet (-2 ft) wide. This conveyor belt 64 and, thus, generally the conveyor system 38 may have a longitudinal length of between about two feet (-2 ft) and about six feet (-6 ft); e.g., between about three to four feet (-3-4 ft) wide. Of course in other embodiments, the mobile robot 30 may have a different form factor than that described above. The mobile robot 30, for example, may be smaller or larger in width and/or length than the exemplary dimensions provided above. For example, the mobile robot 30 may alternatively be configured to support and transport relatively large items such as, but not limited to, large packing crates, cargo modules, cargo containers (e.g., standard freight shipping containers), etc.

Figure 14:
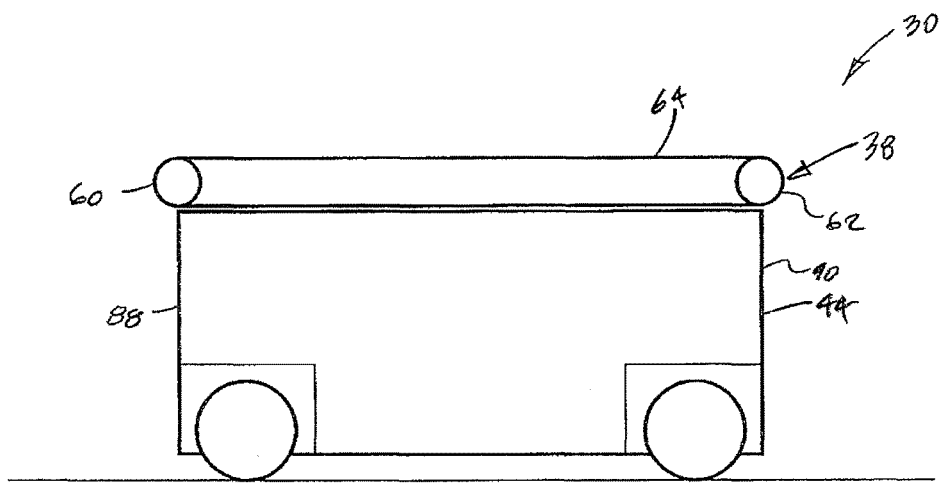
FIGS. 14-17 are a side view diagrammatic illustrations of alternate embodiment mobile robots.
Figure 15:
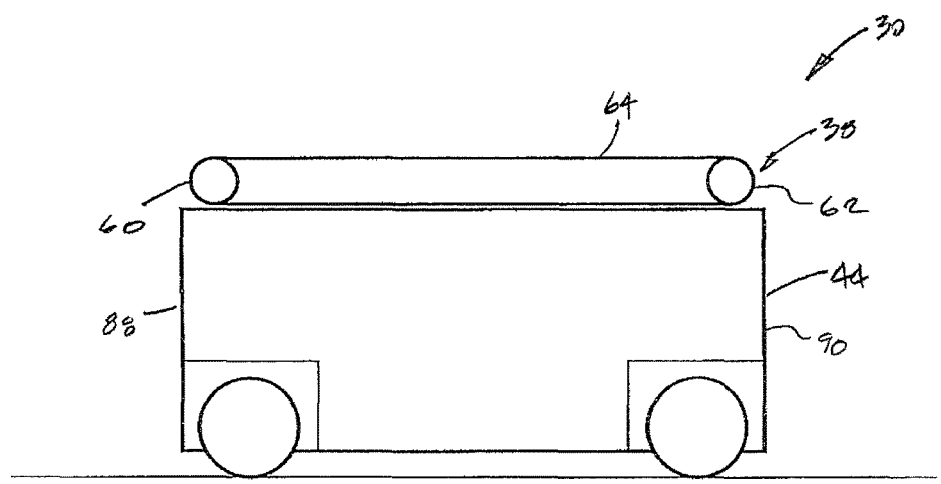

In some embodiments, referring to FIG. 1, the opposing longitudinal ends 60 and 62 of the conveyor system 38 (e.g., the ends of the conveyor belt 64) are substantially aligned with opposing longitudinal outermost ends 88 and 90 of the mobile robot base 44. However, in other embodiments, one or more of these ends 60 and 88, 62 and 90 may be misaligned. For example, referring to FIG. 14, one or more of the longitudinal ends 60 and 62 of the conveyor system 38 (e.g., the ends of the conveyor belt 64) may each project longitudinally out from and thereby overhang a respective end 88, 90 of the mobile robot base 44. In another example, referring to FIG. 15, one or more of the longitudinal ends 60 and 62 of the conveyor system 38 (e.g., the ends of the conveyor belt 64) may each be longitudinally recessed in from a respective end 88, 90 of the mobile robot base 44.

Figure 16:
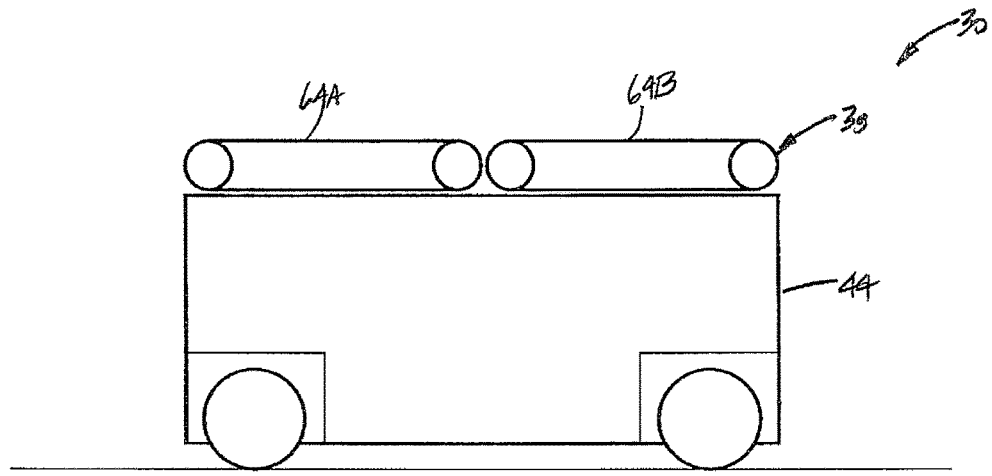
Figure 17:
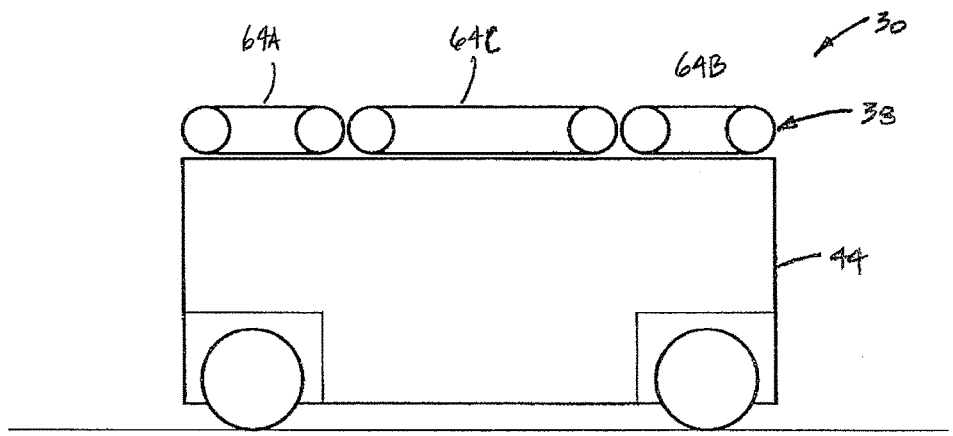

In some embodiments, referring to FIG. 1, the conveyor system 38 may consist essentially of (e.g., generally only) the conveyor belt 64 for supporting and moving the item 32 (or items or quantity of media). However, in other embodiments, the conveyor system 38 may also include one or more additional devices; e.g., conveyor belts. For example, referring to FIG. 16, the conveyor system 38 includes a set of two serially arranged conveyor belts 64A and 64B. In another example, referring to FIG. 17, the conveyor system 38 includes a set of three (or more) serially arranged conveyor belts 64A, 64C and 64B. Each of these conveyor belts 64A-64C may have a similar configuration and operability as the conveyor belt 64 described above. In particular, each of the conveyor belts 64A-64C may be configured to support and move there-along an item 32 (or items or a quantity of media). Each of the conveyor belts 64A-64C may also be configured to individually or collectively adjust its vertical height and/or inclination using one or more actuators; e.g., see actuators 72 in FIGS. 10 and 11).

In some embodiments, referring to FIG. 9, the conveyor system 38 may be configured to receive, move and provide an item 32 all along a common direction; e.g., along a generally straight line trajectory.

Figure 18:
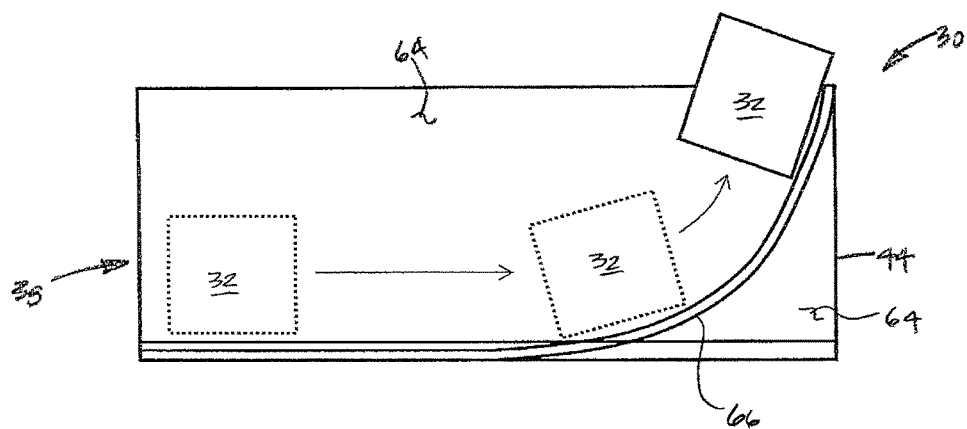
FIGS. 18-20 are top view diagrammatic illustrations of more alternate embodiment mobile robots.

In other embodiments, the conveyor system 38 may alternatively be configured to receive, move and provide an item 32 along different directions; e.g., along a curved trajectory. For example, referring to FIG. 18, at least one of the guiderails 66 may be configured to change the trajectory of the item 32 as it is moved by the conveyor belt 64. In this manner, the conveyor system 38 may receive the item 32 along a first (e.g., generally longitudinal) direction, but provide the item 32 along a second (e.g., lateral) direction, where there is an offset angle defined between the first and the second directions. This offset angle may be approximately ninety degrees (90°) or an acute or obtuse angle.

Figure 19:
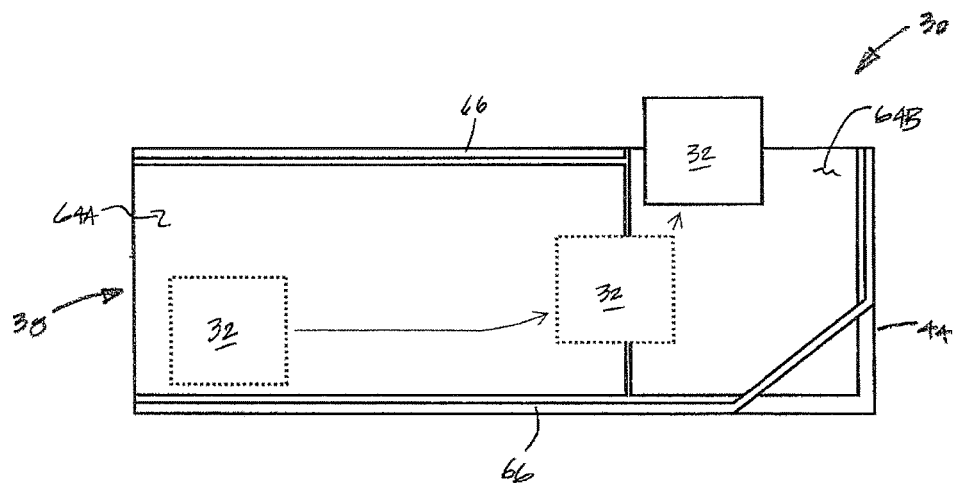

In another example, referring to FIG. 19, the conveyor system 38 may include a plurality of conveyor belts; e.g., 64A and 64B. A first of these conveyor belts 64A is configured to receive and move the item 32 along a first (e.g., generally longitudinal) direction at one end. A second of the conveyor belts 64B is configured to move the item 32 along a second (e.g., generally lateral) direction at the other end.

Figure 20:
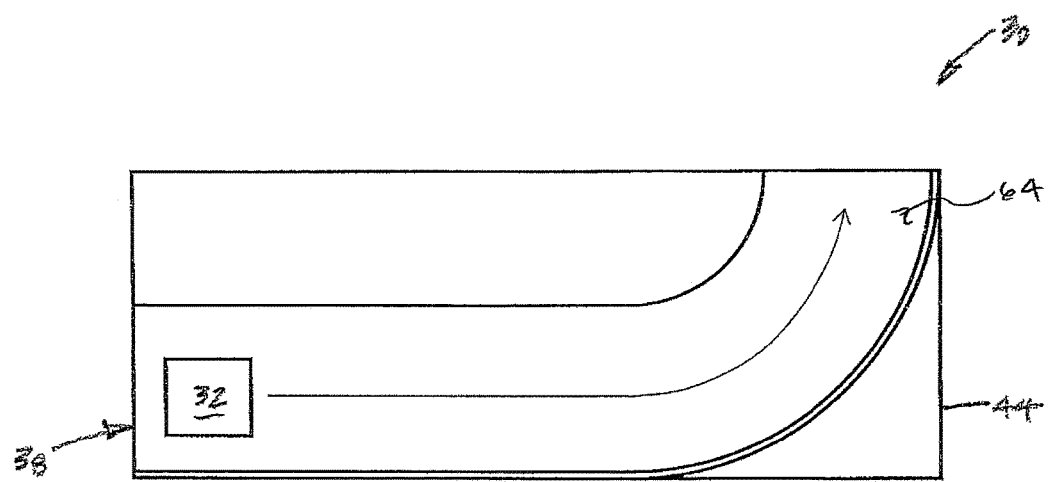

In still another example, referring to FIG. 20, the conveyor system 38 may include at least one conveyor belt 64 configured to follow a changing (e.g., straight and then arcuate) trajectory. In this manner, the conveyor belt 64 may receive the item 32 along a first (e.g., generally longitudinal) direction at one end. The conveyor belt 64 may then provide the item 32 along a second (e.g., generally lateral) direction at the other end.

In still yet another example, the conveyor system 38 may be configured with a turntable. This turntable may be configured to change the orientation of the conveyor system 38 such that, for example, the conveyor belt 64 may receive an item 32 along a first direction but thereafter provide the item 32 along a different second direction without requiring movement of the mobile robot 30.

In some embodiments, the mobile robot 30 may further be configured with a manipulator system, which may be configured separate and discrete from the conveyor system 38. This manipulator system may include one or more manipulators adapted to move or assist with the movement of one or more of items. In an exemplary embodiment, each of the manipulators may be configured as a robotic manipulator arm.

Each manipulator arm may be electronically, hydraulically, pneumatically and/or mechanically actuated. Each manipulator arm may include an end effector, which is connected to one or more arm members (e.g., linkages). Examples of an end effector include, but are not limited to, a gripping device, a suction device, a vacuum device, an electromagnet, a winch, a clasp, the marking device, etc.

The manipulator system may also or alternatively include one or more types of manipulators other than those described above. For example, one or more of the manipulators may each be configured as a pallet jack, a lift platform, a slide carriage, a scissor lift or a crane.

It is worth noting, the mobile robot 30 embodiments described above may be classified as zero infrastructure mobile robots. The term "zero infrastructure" may describe a mobile robot which does not require any embedded wires, painted lines, guiderails, etc. for operation. The term "zero infrastructure" may also or alternatively describe a mobile robot which does not require any devices which are peripheral thereto for operation. The present disclosure, however, is not limited to zero infrastructure type mobile robots. For example, the mobile robot 30 may be configured to follow lines applied to or wires embedded within a floor. In another example, the mobile robot 30 may be configured to follow or ride on one or more rails/tracks.

It is to be understood that the terminology used herein is used for the purpose of describing specific embodiments, and is not intended to limit the scope of the present disclosure. It should be noted that as used herein, the singular form's of "a", "an" and "the" include plural references unless the context clearly dictates otherwise. In addition, unless defined otherwise, all technical and scientific terms used herein have the same meaning as commonly understood by one of ordinary skill in the art to which this disclosure belongs.

Although the description above contains many specific examples, these should not be construed as limiting the scope of the embodiments of the present disclosure, but as merely providing illustrations of some of the presently preferred embodiments of the present invention. It will be appreciated by those skilled in the art that changes could be made to the embodiments described above without departing from the broad inventive concept thereof. It is to be understood therefore that this disclosure is not limited to the specific embodiments disclosed herein, but it is intended to cover modifications within the spirit and scope of the embodiments of the present disclosure. Accordingly, the present invention is not to be restricted except in light of the attached claims and their equivalents.

I claim:

1. A system comprising:
a first conveyor belt system for receiving, supporting and transporting items from an entry point in a facility to at least a destination point in the facility;
an autonomous mobile robot capable of independently moving to any location within the facility without a need for any additional physical or mechanical infrastructure or guide wires, the autonomous mobile robot comprising a second conveyor belt system operative to be positioned to a position proximate the destination point in the facility proximate to the first conveyor belt system for readily accepting the items from the first conveyor belt system onto the second conveyor belt system and supporting the items on the second conveyor belt system; and a controller in communication with one or more of the first conveyor belt system, the autonomous mobile robot, and the second conveyor belt system, wherein the controller is configured to perform operations comprising:
(1) identifying a particular item being moved by the first conveyor belt system between the entry point and the destination point;
(2) identifying at least a third location from a plurality of additional locations within the facility to which the autonomous mobile robot is to transport the particular item;
(3) positioning the second conveyor belt system via the autonomous mobile robot to a position proximate to the first conveyor belt system as the particular item is approaching the destination point of the first conveyor belt system;
(4) advancing the first conveyor belt system as well as the second conveyor belt system at particular speeds and distances to enable the particular item to be safely transferred from the first conveyor belt system to the second conveyor belt system; and
(5) transporting the particular item via the autonomous mobile robot to the third location.

2. The system as defined in claim 1, further comprising the controller being configured to autonomously activate the second conveyor belt system at the third location to safely unload the item from the second conveyor belt system.

3. The system as defined in claim 1, wherein a height of the second conveyor belt system is adjustable to vertically line up with at least the first conveyor belt system, wherein the controller is further configured to perform operations comprising:
autonomously adjusting the height of the second conveyor belt system to match a height of the first conveyor belt system to enable safe transfer of the item from the first conveyor belt system to the second conveyor belt system.

4. The system as defined in claim 1, wherein the second conveyor belt system accommodates at least two items at a time, wherein the controller is configured to perform operations comprising:
positioning the second conveyor belt system to accept a second item after it already has a first item thereon; and
moving the autonomous mobile robot to a first location to unload one item from the second conveyor belt system and thereafter moving the autonomous mobile robot to a second location to unload the second item from the second conveyor belt system.

5. A method comprising:
receiving and transporting items on a first conveyor belt system from an entry point in a facility to at least a destination point in the facility;
identifying, via a controller, a particular item being moved by the first conveyor belt system between the entry point and the destination point;
identifying, via the controller, at least a third location from a plurality of additional locations within the facility to which an autonomous mobile robot is to transport the particular item, wherein the autonomous mobile robot independently moves to any location within the facility without a need for any additional physical or mechanical infrastructure or guide wires, the autonomous mobile robot comprising a second conveyor belt system operative to be positioned to a position proximate the destination point in the facility proximate to the first conveyor belt system for readily accepting the items from the first conveyor belt system onto the second conveyor belt system and supporting the items on the second conveyor belt system;
positioning the second conveyor belt system via the autonomous mobile robot to a position proximate to the first conveyor belt system as the particular item is approaching the destination point of the first conveyor belt system;
advancing the first conveyor belt system as well as the second conveyor belt system at particular speeds and distances to enable the particular item to be safely transferred from the first conveyor belt system to the second conveyor belt system; and
transporting the particular item via the autonomous mobile robot to the third location.

6. The method as defined in claim 5, further comprising autonomously activating the second conveyor belt system at the third location to safely unload the item from the second conveyor belt system.

7. The method as defined in claim 5, wherein a height of the second conveyor belt system is adjustable to vertically line up with at least the first conveyor belt system, wherein method further comprises:
autonomously adjusting the height of the second conveyor belt system to match a height of the first conveyor belt system to enable safe transfer of the item from the first conveyor belt system to the second conveyor belt system.

8. The method as defined in claim 7, wherein the second conveyor belt system accommodates at least two items at a time, wherein the method further comprises:
positioning the second conveyor belt system to accept a second item after it already has a first item thereon; and
moving the autonomous mobile robot to a first location to unload one item from the second conveyor belt system and thereafter moving the autonomous mobile robot to a second location to unload the second item from the second conveyor belt system.

* * * * *